(12) United States Patent
Jarvis

(10) Patent No.: US 6,501,057 B1
(45) Date of Patent: Dec. 31, 2002

(54) RESIDUALLY HEATED FOOD CARRIER

(75) Inventor: Charles W. Jarvis, Irvine, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 0 days.

(21) Appl. No.: 10/003,765

(22) Filed: Nov. 1, 2001

(51) Int. Cl.$^7$ ................................................ H05B 6/12
(52) U.S. Cl. ................ 219/621; 219/622; 219/624; 219/649; 219/386; 126/246; 99/DIG. 14
(58) Field of Search ............................ 219/620, 621, 219/622, 624, 647, 649, 386, 387; 126/246, 375, 400; 99/DIG. 14, 451

(56) References Cited

U.S. PATENT DOCUMENTS

| | | | | |
|---|---|---|---|---|
| 4,020,310 A | * | 4/1977 | Souder, Jr. et al. | 219/386 |
| 4,235,282 A | * | 11/1980 | De Filippis et al. | 126/246 |
| 5,603,858 A | * | 2/1997 | Wyatt et al. | 219/620 |
| 5,611,328 A | * | 3/1997 | McDermott | 126/246 |
| 5,894,788 A | * | 4/1999 | Violi et al. | 219/622 |
| 6,097,014 A | * | 8/2000 | Kirsch | 219/621 |
| 6,232,585 B1 | * | 5/2001 | Clothier et al. | 219/620 |

* cited by examiner

Primary Examiner—Philip H. Leung
(74) Attorney, Agent, or Firm—George F. Bethel

(57) ABSTRACT

A food carrier having inner and outer walls with insulation therebetween and ledges on the interior walls for receipt of a heated food container. A heating unit is provided which is adapted for placement on the ledges in the same manner as the food containers. The heating unit can be provided with a heating element that can be heated inductively, in an oven, or by other suitable heating. The heating element can be formed of a solid to solid phase change material or a solid to liquid phase change material or other heat retentive compositions or compounds.

19 Claims, 5 Drawing Sheets

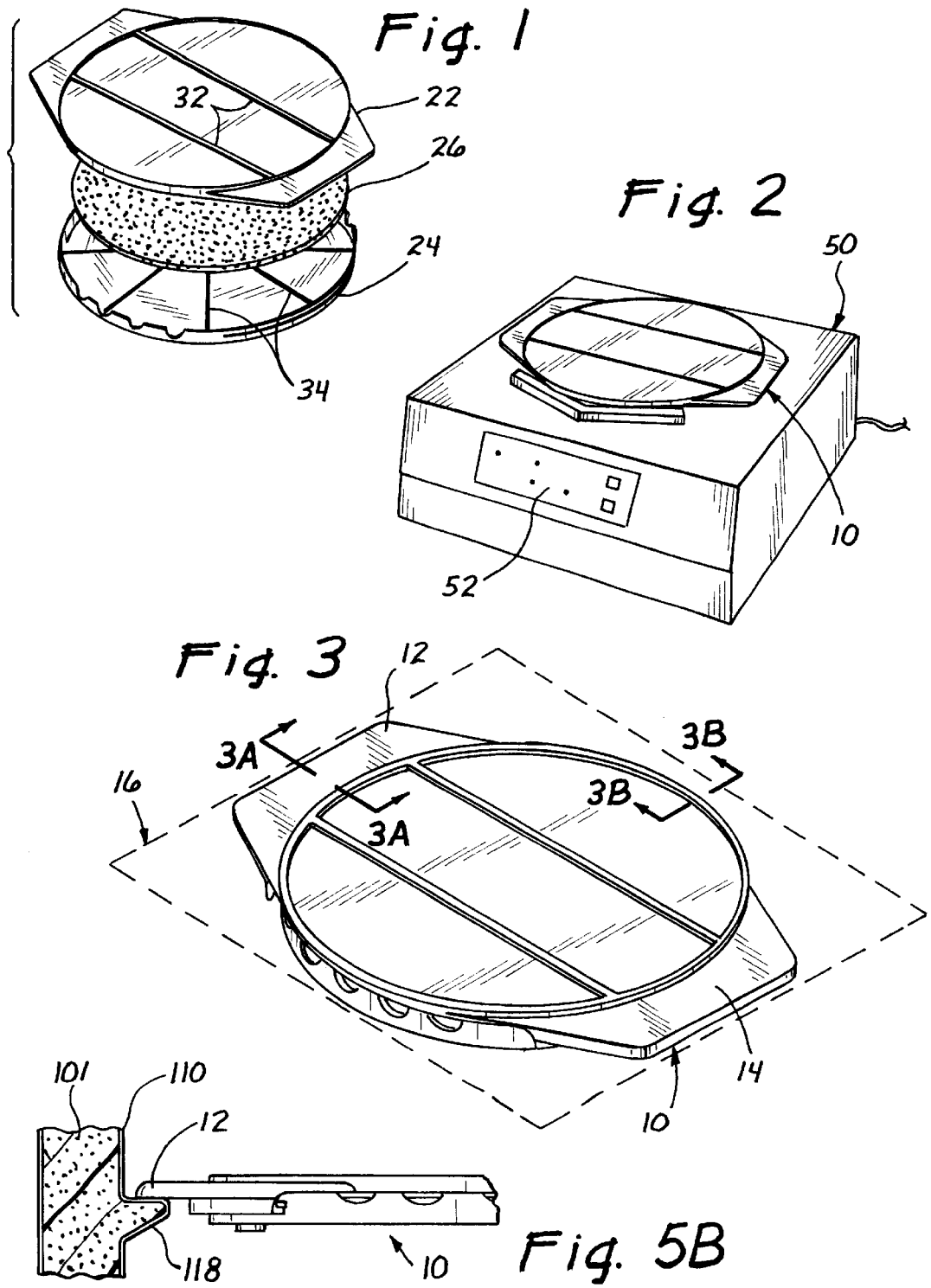

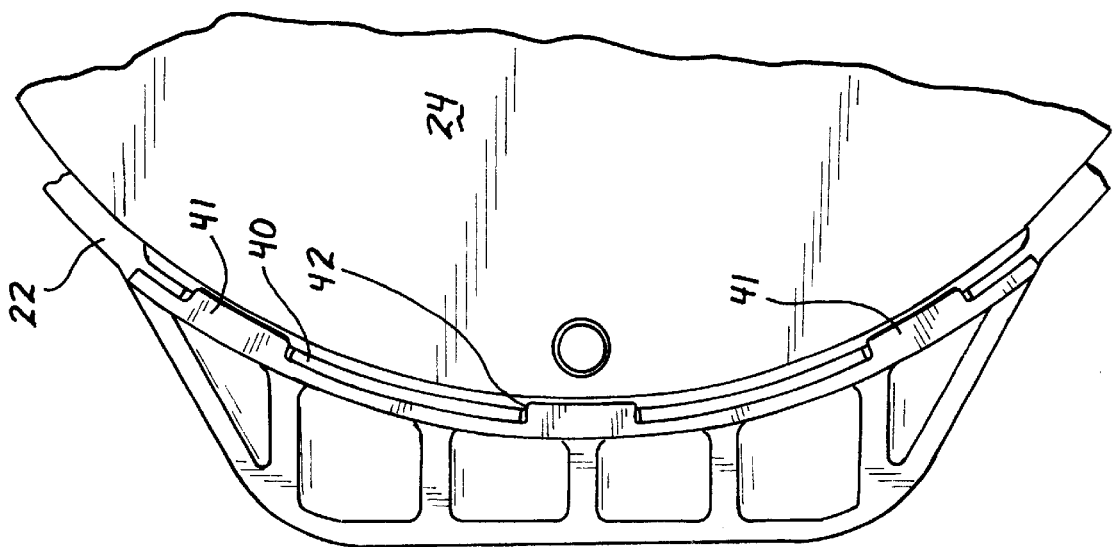
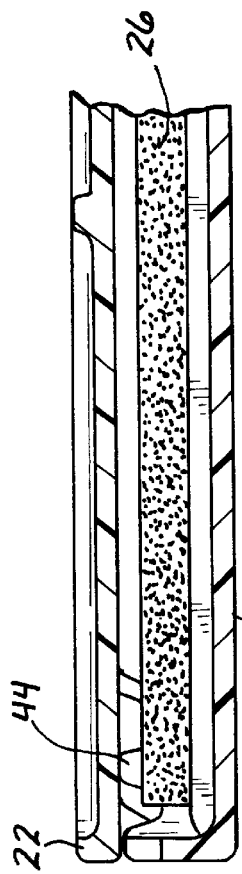
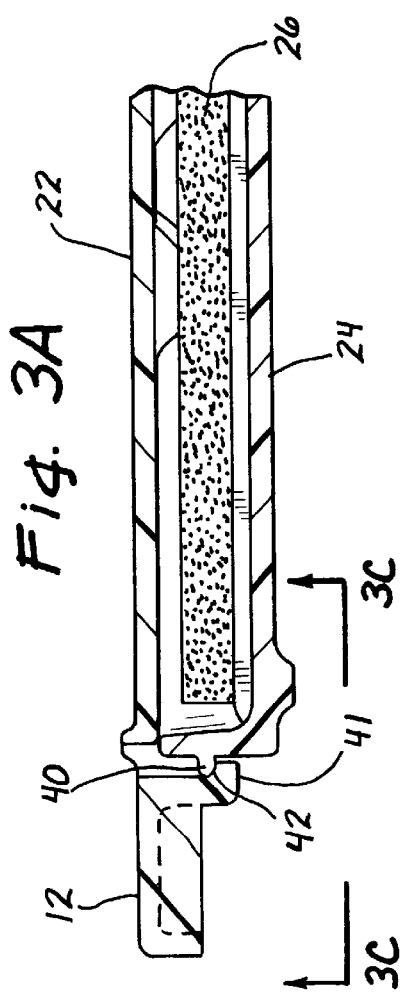

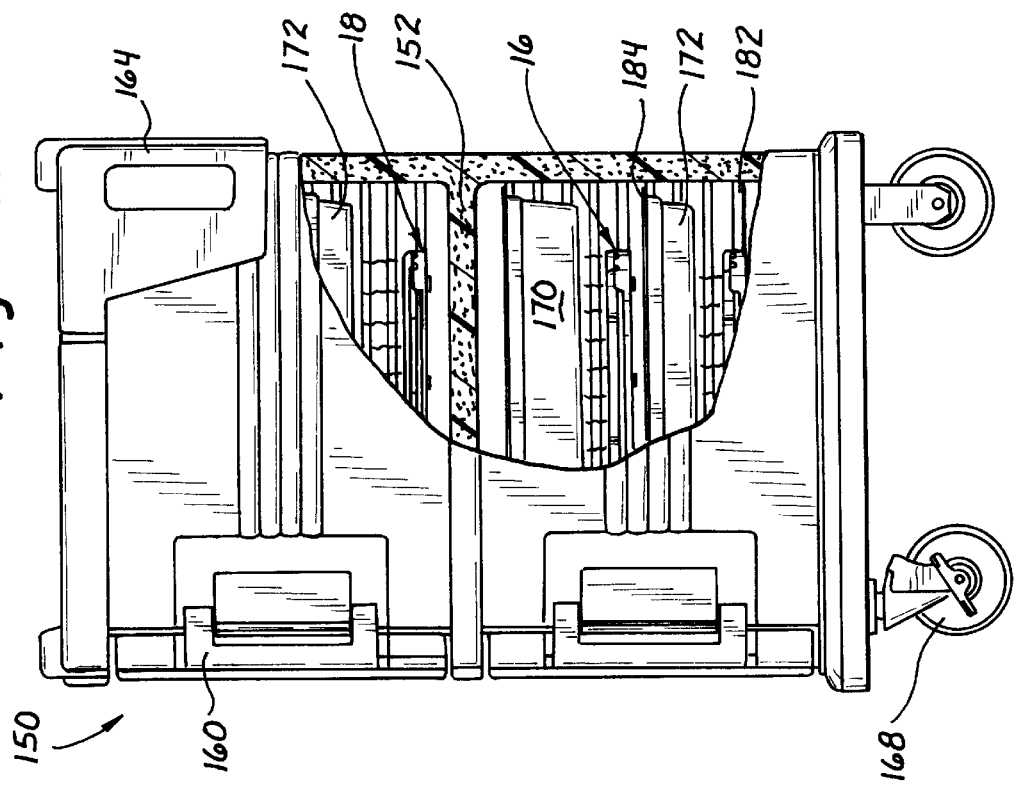
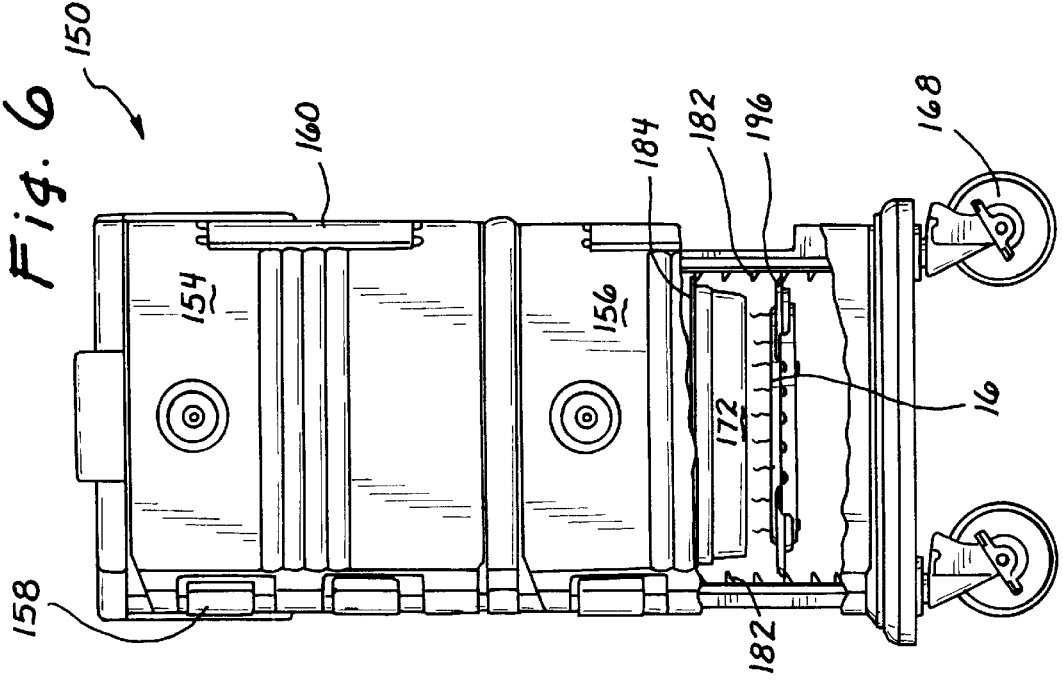

RESIDUALLY HEATED FOOD CARRIER

BACKGROUND OF THE INVENTION

1. Field of the Invention

The field of this invention resides within the food service art. In particular, it resides within the food service art wherein containers are utilized for holding food at an elevated temperature to maintain them warmly in a safe environment. Such food holding containers are known as food carriers and can be placed on wheels, provided with handles, and insulated. In particular, this invention resides within the food carrier art wherein a plastic molded container having insulated walls is utilized for holding food on a warm and serviceable basis.

2. Prior Art

The prior art of food service has utilized various food service carriers in numerous forms. It is well known in institutional food service such as for schools, hospitals, restaurants, banquet facilities, and other institutions including fast food service that insulated carriers are utilized.

Such insulated carriers are formed oftentimes of a double walled plastic configuration. The double walled plastic configuration can generally be in the form of a cuboid or rectangular carrier. The carrier oftentimes has a configuration for receiving pans, trays, or other like containers for food to be served at a later point in time while being kept warm in the carrier.

More specifically, it is known to place pans of food or trays of food in carriers and maintain them in a heated state. The maintenance of the food in the carriers at a heated state is generally based upon the insulating properties of the carrier in order to hold the residual heat of the food within the carrier. Such carriers although capable of maintaining food warm for an extended period of time can not rely entirely upon the residual heat of the food alone over extended periods.

This invention supplements the heated food as to the warmth thereof. The supplementary heat is provided by a disk, slab, shelf, or other material holding a highly heat retentive substance or element. Such heat retentive substances are known in the art and will be specified hereinafter in greater detail.

The invention particularly has the feature of being able to place trays on various racks, ledges, or shelving of a food carrier. The trays placed at the various levels of the food carrier can be held on such racks, ledges, or other holders in a separated manner.

Supplementing the heat of the food in the pans, trays, or containers held on the racks is a slab, disk, or shelving like member having a residually heated material therein for retaining the heat in the carrier. With the residually heated supplemental material, the entire carrier can be closed and maintained at an elevated temperature within the carrier for an extended period of time over that which is currently available in the art.

SUMMARY OF THE INVENTION

In summation, this invention comprises a food carrier having shelves, ledges, or racks which receive food pans, trays, or other food containers thereon at various levels which can be heated residually by a slab, disk, or shelf having residual heat retention properties that can be moved and oriented within the carrier for extended heating of the carrier with the food therein.

More specifically, the invention incorporates the aspects of a food carrier having insulated walls. The food carrier with the insulated walls has a door for access thereto. The food carrier can be made of a double walled plastic material having insulation therebetween.

Within the food carrier are a plurality of racks, shelves, ledges, or other holding and supporting means in order to support food containers. Such food containers can be in the form of pans, trays, crocks, and other similar items being provided with and without lids.

The food pans or containers are often designed with flanges which can rest or be supported on ledges, racks, or shelving within the heated food carrier. The food containers within the food carrier can be adjusted as to their relative position within the carrier and provided with sufficient space to allow the residually heated slab, disk, or shelf to be placed on the same food container holding racks or ledges for orientation on a variable basis within the food carrier.

The foregoing allows for a variably oriented holding, warming, heating, and carrying of food on a residually heated basis over an extended period of time.

BRIEF DESCRIPTION OF THE DRAWINGS

FIG. 1 shows an exploded perspective view of one of the embodiments of the warming unit of this invention.

FIG. 2 shows a perspective view of the warming unit being inductively heated on an inductive heater.

FIG. 3 shows a perspective view of a warming unit in a completed configuration.

FIG. 3A shows a sectional view in the direction of lines 3A—3A of FIG. 3.

FIG. 3B shows a sectional view in the direction of lines 3B—3B of FIG. 3.

FIG. 3C shows a bottom fragmented view of the heating unit as shown in the direction of lines 3C—3C of FIG. 3A.

FIG. 5B shows a detailed view of the warming unit as taken in the direction of circle 5B of FIG. 5.

FIG. 6 shows a front elevation view of a food carrier having multiple compartments and on wheels.

FIG. 6A shows a side elevation view of the food carrier shown in FIG. 6 with a portion broken away to also show another embodiment of the heating unit.

DESCRIPTION OF THE PREFERRED EMBODIMENTS

Figure 4:
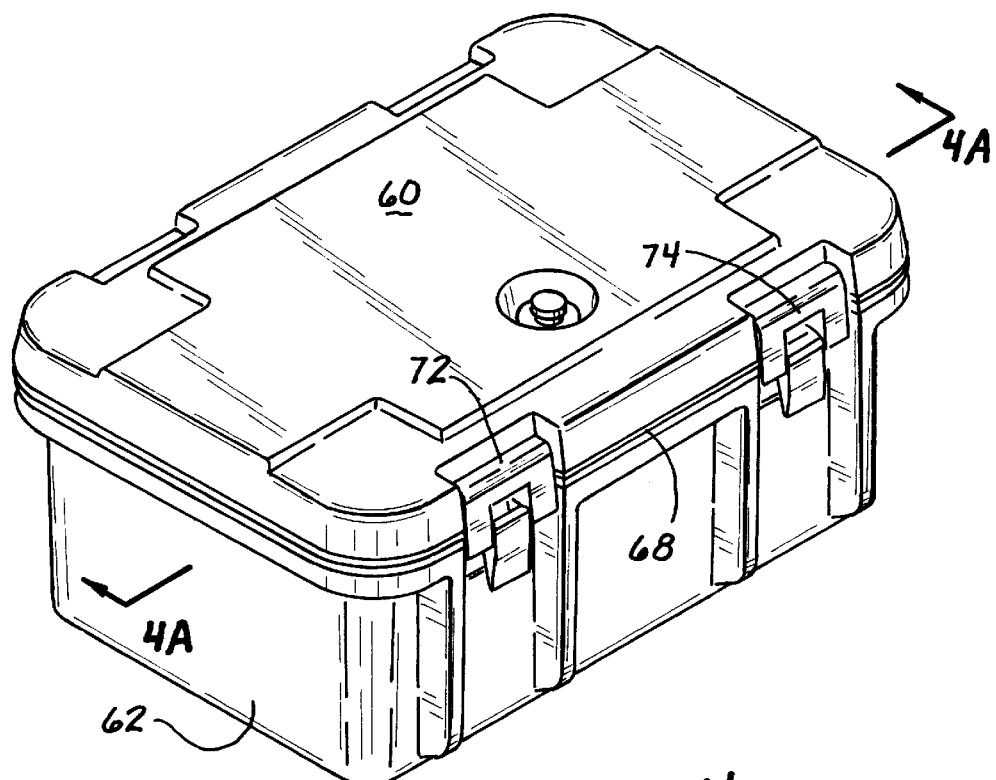
FIG. 4 shows a perspective view of a food carrier having a lid with snap over latches.

Looking specifically at FIG. 3, it can be seen that a heating unit 10 has been shown. The heating unit 10 is shown in a circular configuration with a pellet therein. The heating unit 10 has ears, extensions, lips, or handles 12 and 14. This particular configuration having handles or ears 12 and 14 can be made in the form of a rectangle such as the outlined rectangular form or unit 16. The outlined rectangular form 16 is shown specifically as a rectangular heating unit 16 in FIG. 6A. The heating unit 16 shown in FIG. 6A is of a suitable rectangular configuration to fit into the food carrier and be supported.

Suffice it to say, the heating unit 10 of this invention can be in any form so long as it incorporates the heating elements and the handles and ears 12 and 14 or other suitable means for seating or being supported in a food carrier. The seating or support can also merely be a periphery of the heating unit 10 of sufficient margins to seat on the supports defined hereinafter.

Looking more specifically at FIG. 1, it can be seen that a molded top or upper portion 22 of the heating unit 10 has been shown. A complimentary bottom or lower portion 24 has been shown. The bottom portion 24 and top portion 22 can be screwed together with a bayonet fitting, snapped together with snap over extensions, tabs, or other suitable means to create the entire heating unit 10.

Within the heating unit 10 is an element 26 which maintains the heat of the heating unit after it has been heated to a particular temperature. The heating element, pellet, slab, or disc 26 of the heating unit can be rectangularly configured as in the showings of FIGS. 3 and 6A of rectangular unit 16. Various configurations can be utilized having the element 26 of this particular invention. The one common aspect being that a holder configuration such as the top and bottom portions 22 and 24 of the heating unit encapsulate the heating element 26 which can be in various forms compositions and compounds as described hereinafter.

The structure for the heating unit in the form of upper portion 22 and lower portion 24 has been shown with ribs on the top 32 and lower ribs 34. These particular ribs 32 and 34 provide reinforcing which can be utilized in any particular manner in other configurations which are rectangular, oblong, or otherwise configured.

For purposes of illustration, the heating unit 10 will be described as the rounded or oblong heating unit 10 even though other configurations such as the rectangular configuration 16 generally outlined in FIG. 3 in dotted form can be utilized having the same elements.

Looking more particularly at FIG. 3A, the ears 12 handles or extensions are shown. The ears 12 can be of any suitable configuration as long as they provide a resting point and in some cases a handle for lifting the unit 10. The ears 12 and 14 in this particular configuration are conjoined to the top portion 22. The top portion 22 has been bayonet fitted or snapped in at an extension or flange 40 which is received in a groove 42. The flange 40 is formed as an outer rimmed portion or other configuration on the lower portion 24. The groove 42 is formed under tabs, extensions, or underlying fingers 41.

Encapsulated within the upper and lower portions 22 and 24 respectively of the unit 10, is the heating element 26 which will be defined hereinafter.

Looking more particularly at FIG. 3B it can be seen wherein the top portion 22 is shown with a bottom portion 24 having a spacer, boss, or other protuberance 44. This spacer 44 can be used as a spacer between the respective upper and lower portions and at the same time provide spacing for the heating element 26.

FIG. 3C is shown as a view looking upwardly at the under side of the ear, extension, lip, or handle 12. The lower portion 24 can be seen attached to the upper portion 22 by means of the groove 42 provided on a tab or flange 41 that are gapped in an arcuate manner around the periphery of the upper portion 22. The extension or flange 40 is seated between them and threaded in a manner to provide joindure. Other suitable joindures can be utilized in any bayonet fitting, snap over fitting, or flange configuration which can snap fit between the lip 41 defining groove 42 and the interior flange 40. Also, it should be understood that in the rectangular configurations 16 where a threaded ability or bayonet fitting can not be utilized, that a snap tab fitting can be utilized to hold a heating element such as heating element 26.

After the heating element 26 is emplaced within the heating unit 10, or 16 as the case may be, it can be placed on an inductive heater 50 which is well known in the art. The inductive heater 50 can be controlled at a control panel 52 which inductively heats the heating unit 10 in a relatively short period of time. Other heating elements other than inductively heated material compounds or compositions forming heating element 26 can be utilized and will be defined further hereinafter.

Regardless of how the heating unit 10 is heated, it can then be placed in any other of the types of food carriers set forth hereinafter.

Figure 4A:
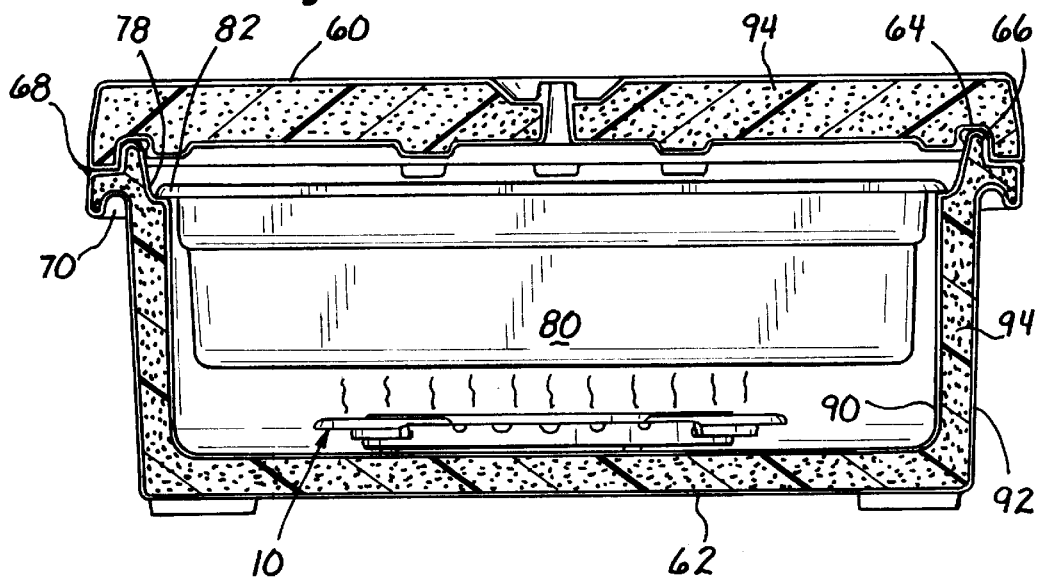
FIG. 4A shows a sectional view of the food carrier shown in FIG. 4 sectioned along lines 4A—4A.

FIGS. 4 and 4A show a food carrier having a lid 60 and a base or lower food holder 62. The lid 60 and base holder 62 are hinged together or provided with snap buckle arrangements as shown in FIG. 4. In this particular configuration, the food carrier comprising lower base holder 62 and lid 60 are such wherein the lid 60 has a groove 64 surrounding the interior periphery thereof which seats on an upper peripheral flange 66. The peripheral flange 66 is on top of a rim 68 which circumscribes the base holder 62. The rim 68 has an undercut 70. This undercut 70 can be utilized for carrying or receiving a snap over type of latch namely snap over latches 72 and 74.

The food carrier in FIGS. 4 and 4A has a ledge 78 on which a food pan or container 80 with its lip or rim 82 rests. The resting food pan 80 can be placed in the carrier in any suitable manner with it actually resting on the base. Also, in the alternative, other supports for a food pan 80 can be utilized.

Within the interior portion of the food holder 62 is a heating unit 10 which can be a rectangular heating unit for rectangular carrier 16 or the round unit 10. This unit has a pellet 26 which can increase the overall latent heat of the food carrier once the food pan 80 has been emplaced therein.

The showings of FIGS. 4 and 4A although showing a circular and eared heating unit in the base of the container 62, can be substituted by other configurations. The embodiment as shown is such wherein the employment of insulated walls such as inner and outer walls 90 and 92 is configured so that the ledge 78 on which the lip 82 seats can be formed within an interior wall, rib, or shelf upon which the food container sits. Also, a spacing provided by a grid, shelf or other means can be emplaced wherein the food pan 80 base is separated from the heating unit 10. Also, it should be noted that insulation 94 between the walls 90 and 92 and within the walls of the lid 60 helps to maintain the heated relationship for the food within the food pan or container 80.

Figure 5:
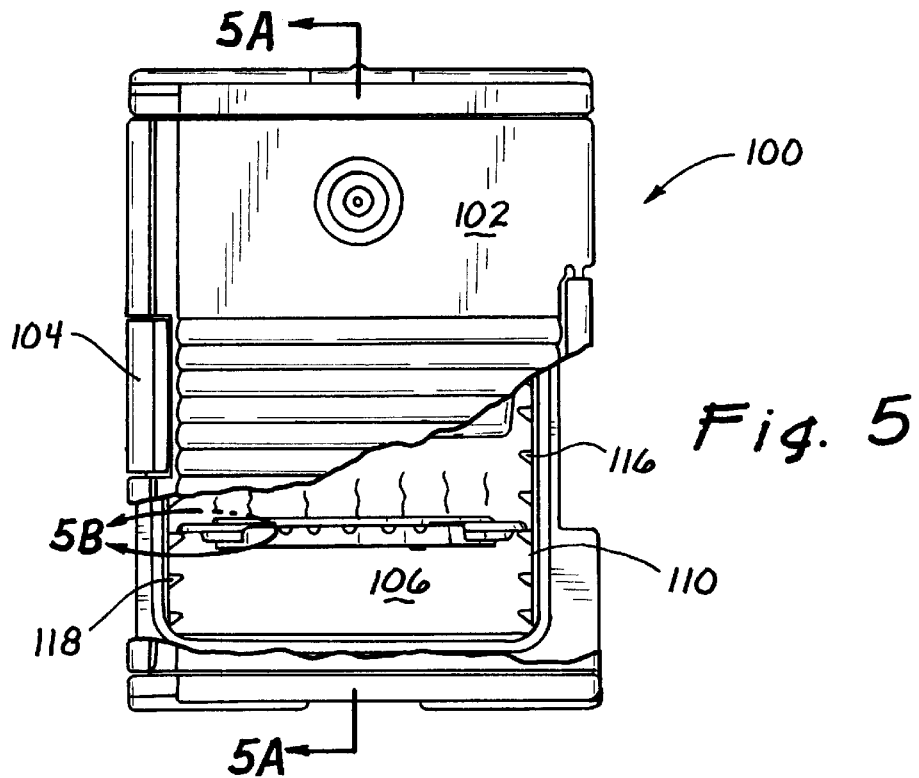
FIG. 5 shows a front elevation view of a food carrier with the heating unit therein having a portion broken away for internal viewing.
Figure 5A:
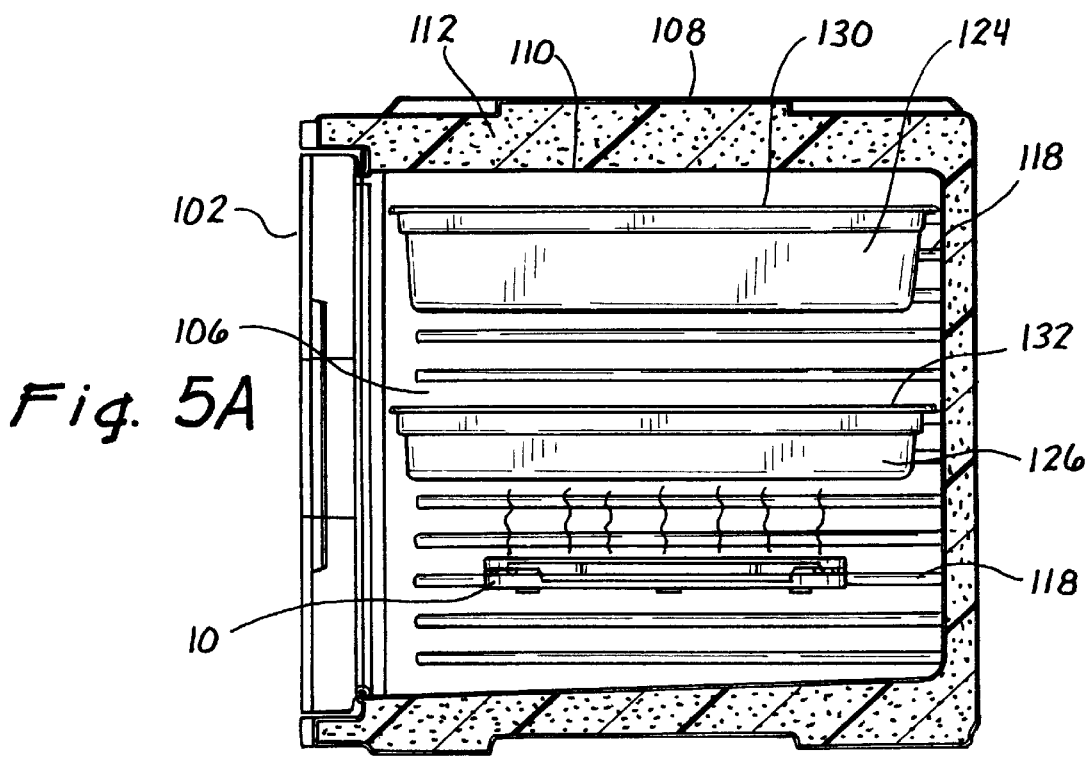
FIG. 5A shows a sectional view in the direction of lines 5A—5A of FIG. 5.

Looking more particularly at FIGS. 5 and 5A, it can be seen wherein a food carrier 100 has been shown. The food carrier 100 has a hinged door 102 which can be opened and secured by a handle 104. The handle can be secured in any over center or closure configuration in order to close the door 102 over the interior 106 of the carrier 100. The food carrier has walls that have been insulated by plastic urethane or other foam 101 similar to those of FIGS. 4 and 4A wherein an outer wall 108 and an inner wall 110 is shown with insulation 112 between the respective walls. Also, other configurations can be utilized in order to provide the interior orientation as shown in FIGS. 5 and 5A.

The inner walls 110 have been shown with a molded series of ledges 116 on one side and 118 on the other side. These respective molded ledges 116 and 118 are such wherein they support food pans or food containers thereon. Each respective food container or food pan shown in FIGS. 5 and 5A such as containers 124 and 126 have an outer lip or flange such as flange 130 and flange 132. These flanges can be formed in any particular manner and are normally part of a food container such as food containers 124 and 126 in order to provide reinforcement and a lip or ledge around which one can pick up the pan.

The ledges 116 and 118 are shown receiving the lips or flanges 130 and 132 resting thereon. The ledges 116 and 118 can be substituted with rails, notches, protuberances, tabs, racks, or other means in order to support the food containers 124 and 126.

The detailed support of the food containers 124 and 126 are effective for other food containers such as trays of food or pans of any particular type. In some cases the food pans or trays forming the containers are configured sufficiently to fit on the shelves, ledges, or rails such as ledges 116 and 118 without a flange 130 or 132.

In order to maintain the heat of the food within the containers 124 and 126, a heating unit 10 or 16 is emplaced within the food carrier 100. The heating unit 10 is shown in greater detail in FIG. 5B resting on ledges 116 and 118 that have been molded on to the inner walls 110. Here again, the ledges 116 and 118 can be formed alternatively with any particular support, rack, ledge, stainless steel shelf, or other means which hold the food pans 124 and 126. The feature being herein that the ears or extensions 12 and 14 or edges of the rectangular unit 16 can rest on the ledges 116 and 118 and be supported. As previously stated, the oblong configuration of FIG. 3 need not be utilized and a similar set of handles 12 and 14 or resting edges can be employed with a rectangular unit such as outlined in dotted configuration 16.

Looking more particularly at FIGS. 6 and 6A, it can be seen that a double tiered food carrier 150 has been shown. The doubled tiered food carrier 150 comprises an upper and lower compartment separated by a wall 152. Both the upper and lower compartments respectively have doors 154 and 156 for closing them. The doors 154 and 156 are hinged on hinge members 158 on the outer periphery and have handles 160 for opening and closing them in a secured manner such as with an over center latch, snap over latch, or any other type 1 of closing handle 160.

The food carriers shown in FIGS. 6 and 6A comprise a handle or grip portion 164 on either side for maneuvering the containers on their casters or wheels 168. Food pans such as the larger food pan 170 and the shallower food pan 172 are shown seated within the food carrier on ledges similar to ledges 116 and 118. In this particular case, the ledges have been enumerated as ledges 182. Ledges 182 receive flanges or outer lips 184 of the food containers such as the large pan 170 and shallower pan 172. These outer flanges 184 are seated on the ledges 182. Ledges 182 can be formed of shelf edges, racks, supports, or brackets extending from the walls.

A heating unit 16 similar to a rectangular unit shown in FIG. 3 has been shown. The heating unit 16 has the same internal heating element 26 except it has been formed and encapsulated in the rectangular carrier 16. The rectangular carrier 16 has ears, ledges, extensions or handles 196 that rest on the ledges 182. Thus, the pans 170 and 172 can be interchanged with the heating unit 16 depending upon the particular location, amount of residual heat, or other characteristics which are to be imparted to the food pans 170 and 172 or other suitable containers and trays.

It should be understood, that the orientation of the food containers such as food containers 170 and 172 as well as the other food containers such as 124 and 126 can be adjustably moved upwardly and downwardly on the racks or ledges. Also, variably sized food containers in depth and other aspects can be placed at different orientations on the ledges such as ledges 182, as well as ledges 116 and 118. This allows for an accommodation of variously sized food containers as well as a movement between various ledges for heating by the heating units 10 and 16. Thus, heating units 10 and 16 can be exchanged in various locales for the food containers.

Double heating units such as heating units 10 and 16 can be placed in stacked relationship for providing greater residual heat within the food carriers such as food carrier 100 and 150. Thus, the interchangeability of food containers and heating units 10 and 16 is enhanced by this invention so that various food carriers such as carriers 100 and 150 can be provided with heating units of various numbers, types, and sizes with the interchangeability of the food containers. This provides a variation in heat and proximity to the food containers for various types of food.

One of the important elements of the heating units 10 and 16 is that the heating element 26 can be of such heat retaining materials known in the art which include among others some of the following.

Various heat retaining materials are known in the art and include among others: metals such as stainless steel, aluminum; copper and the like; plastics; solid to liquid phase change materials such as paraffins, bee's wax, carnauba wax, Cornox wax and a synthetic hardened microcrystalline wax such as Bareco's Petrolite P 20 which is a synthetic petroleum comprised of a low molecular-weight homopolymer of ethylene; crystalline alkyl hydrocarbons; asphalt such as 230 grade; wet sand; salt hydrates; solid to solid phase change materials including among others: pentaerythritol [2,2-Bis (hydroxymethyl)-1,3-propanediol] ($C_5H_{12}O_4$); pentaglycerine [2-hydroxy-methyl-2-methyl-1,3-propanediol] ($C_5H_{12}O_3$) also known as trimethylolethane; neopentyl glycol [2,2-dimethyl-1,3-propanediol ($C_5H_{12}O_2$); neopentyl alcohol ($C_5H_{12}O$); neopentane ($C_5H_{12}$); monoaminopentaerythritol; diaminopentaerythritol; tris(hydroxymethyl) acetic acid; and cross-linked, high density polyethylene (HDPE).

Mixtures of the above materials can be used. In addition, other adjuvant materials can be included among others such as binders, fire retardants, fillers, processing additives, antioxidants, colorants, pigments, catalysts, and the like.

The preferred heat retaining materials are those described above including solid to solid phase change materials. Such materials can be combined with ferromagnetic powders such as manganese zinc ferrites, nickel zinc ferrites, and copper zinc ferrites. These ferromagnetic and heat retentive materials can be bound together with a binder.

The above mentioned heat retentive materials can be heated by any convenient means such as an oven, by microwave, inductive heat such as by an inductive heater 50 or by other means depending upon the identity thereof.

What is claimed is:

1. A food carrier system comprising:
   a food carrier having inner walls and outer walls molded of plastic, having insulation therebetween;
   said inner walls having a plurality of interior plastic ledges molded and formed as part of said inner walls for support of a food container having an exterior flange for seating across said plastic ledges;

a heating unit adapted for being heated outside of said food carrier; and, an external support portion of said heating unit having an exterior dimension adapted for placement on and between said ledges by extending between said ledges and being interchangeable with said food container as to placement on said ledges.

2. The system as claimed in claim 1 further comprising:

said heating unit is adapted for magnetically inductive heating.

3. The system as claimed in claim 1 further comprising:

said heating unit is adapted for heating in an oven.

4. The system as claimed in claim 1 wherein:

said heating unit has a heating element adapted for magnetic inductive heating formed at least in part from metal.

5. The system as claimed in claim 1 wherein:

said heating unit has a heating element formed from a wax.

6. The system as claimed in claim 1 wherein:

said heating unit has a heating element formed from a solid to solid phase change material.

7. The combination of a heat retentive heating unit, a food container and a food carrier adapted for carrying said food container comprising:

a food carrier having inner plastic molded walls and outer plastic molded walls with insulation between said walls;

a plurality of plastic ledges molded as part of said inner plastic walls adapted to receive and support a food container having an outer flange with a dimension for support and seating between each of said plastic ledges; and, a heating unit having an outer extension having a dimension substantially equal to the dimension between said food container outer flanges adapted for placement on and moveable between said plastic ledges for variable interchangeable placement with respect to a food container placed on said ledges.

8. The combination as claimed in claim 7 further comprising:

said heating unit has a heating element therein.

9. The combination as claimed in claim 7 wherein:

said heating element can be inductively heated.

10. The combination as claimed in claim 9 wherein:

said heating element is formed in part from a metal.

11. The combination as claimed in claim 9 wherein:

said heating element is formed of a solid to liquid phase change material.

12. The combination as claimed in claim 9 wherein:

said heating element is formed of a solid to solid phase change material.

13. The combination as claimed in claim 7 wherein:

said heating element can be heated in an oven.

14. A method of maintaining heated food in a food carrier comprising:

heating a food container of food, said food container having a flange around its periphery;

providing a food carrier having plastic molded inner walls and outer molded plastic walls with insulation therebetween;

providing plastic ledges molded as part of and on at least two of said inner walls for supporting said food containers on said flange between said ledges;

heating a heating unit having an outer extension substantially of the same dimension across said food container flange for supporting it by said ledges which can be interchanged with said food container and having a heating element therein, to an elevated temperature above the temperature of said food; and, placing at least one heating unit on its outer extension between said ledges for extending the heated condition of said food.

15. The method as claimed in claim 14 further comprising:

inductively heating said heating element.

16. The method as claimed in claim 14 further comprising:

heating said heating element in an oven.

17. The method as claimed in claim 14 wherein:

said heating element is formed of metal, wax, or a solid phase change material.

18. A method of maintaining heated food in a food carrier comprising:

heating a food container of food, said food container having a flange extending around its periphery;

providing a food carrier having inner plastic molded walls and outer plastic molded walls with insulation therebetween;

providing plastic ledges formed and molded as part of at least two of said inner walls for supporting said food container on its flange;

heating a heating unit having an outer extension of the dimension measured across the flange of said food container and having a heating element to a phase change of the material of said heating element, said heating unit being interchangeably supported on said ledges with s aid food container; and, placing at least one heating unit on said ledges for helping to maintain the heat of said food.

19. A method as claimed in claim 14 further comprising:

said phase change material is heated to pass from a solid to a solid phase change.

* * * * *